Aug. 6, 1929.  C. F. FERNALD  1,723,145
BARBECUE BROILER
Filed Jan. 23, 1928   2 Sheets-Sheet 2

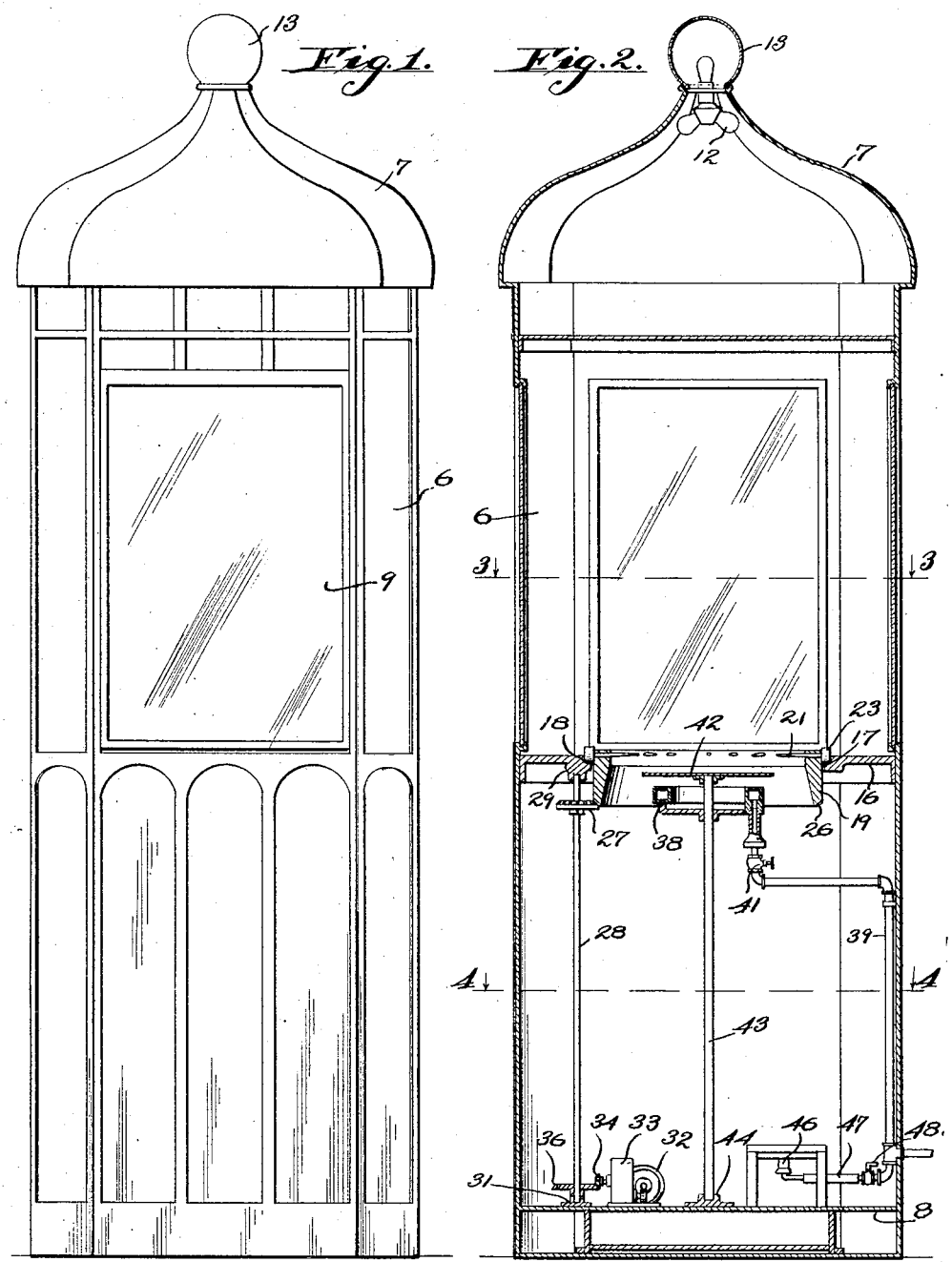

Patented Aug. 6, 1929.

1,723,145

UNITED STATES PATENT OFFICE.

CHARLES F. FERNALD, OF LOS ANGELES, CALIFORNIA, ASSIGNOR OF ONE-HALF TO JOSEPH M. LUGO, OF LOS ANGELES, CALIFORNIA.

BARBECUE BROILER.

Application filed January 23, 1928. Serial No. 248,723.

This invention relates to broilers and more particularly to barbecue broilers capable of cooking small articles of food.

An object of the invention is the provision of a barbecue broiler capable of broiling small particles of food such as sausages and the like.

Another object is the provision of a broiler of the above class which will cook the articles evenly on all sides.

Another object is the provision of a broiler which is of such compact construction that it is adapted to be housed in a relatively small booth, making the broiler especially adaptable to use in amusement parks.

The invention possesses other objects and features of advantage, some of which, with the foregoing, will be set forth in the following description of the preferred form of my invention which is illustrated in the drawings accompanying and forming part of the specification. It is to be understood that I do not limit myself to the showing made by the said drawings and description, as I may adopt variations of the preferred form within the scope of my invention as set forth in the claims.

Referring to the accompanying drawings wherein similar reference characters denote similar parts throughout:

Figure 1 is a side elevation of the booth in which the present embodiment of my broiler is housed.

Figure 2 is a vertical sectional view of the booth of Figure 1, and broiler therein contained.

Figure 3:
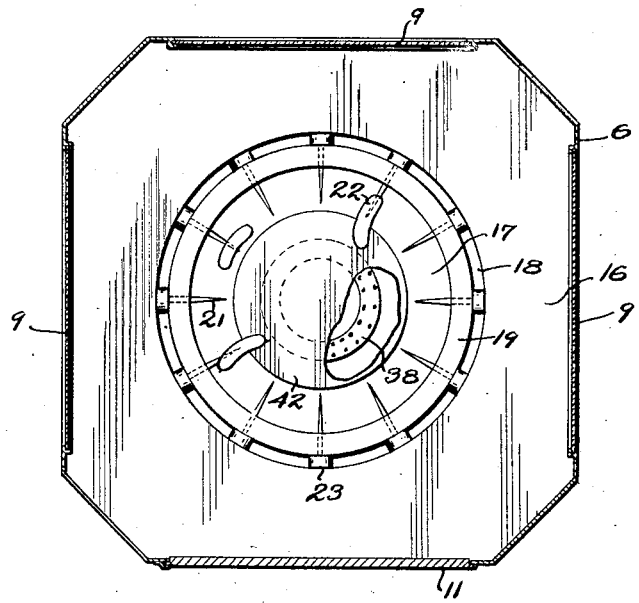
Figure 3 is a horizontal sectional view, the plane of section being taken on the line 3—3 of Figure 2 in the direction of the arrows.
Figure 4:
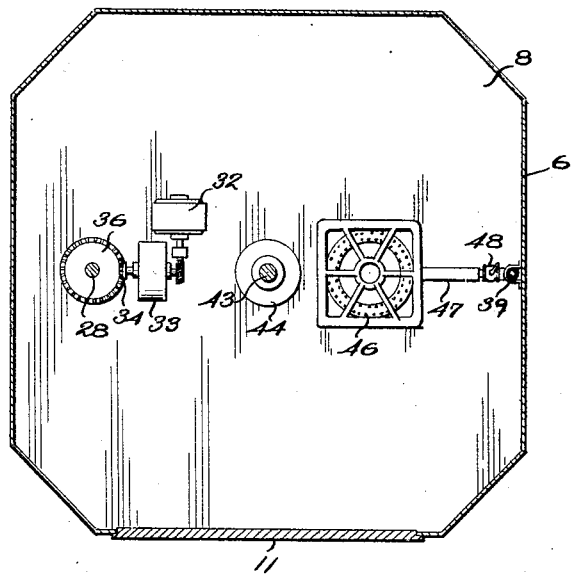
Figure 4 is a horizontal sectional view, the plane of section being taken on the line 4—4 of Figure 2 in the direction of the arrows.

In its present embodiment the broiler of my invention is shown housed within a relatively small booth comprising walls 6, an ornamental roof 7 and a floor 8. Three of the walls are supplied with suitable windows 9 and the other wall with a door 11. A cluster of lights 12 are mounted in the apex of the roof 7 for the purpose of illuminating the interior of the booth, and a translucent globe 13 is at the top of the roof 7.

A partition 16 extends horizontally of the booth, preferably closely below the bottom line of the windows 9. A circular aperture 17 is provided centrally of this partition 16 and the upper edge of the partition surrounding this central aperture is provided with a shoulder 18 in the form of a circular track. A ring 19 of diameter slightly smaller than the aperture 17 is mounted for rotary movement in a horizontal plane concentrically of the aperture 17. A plurality of spits 21 extend radially through the ring 19 toward its center, the inner ends of these spits being pointed to facilitate placing thereon sausages 22 or other small articles of food to be broiled. The outer end of each of the spits 21 has a roller 23 rigidly mounted thereupon, these rollers being seated upon the circular track 18 to revolubly support the ring 19. It is to be understood, of course, that the spits 21 are rotatable in respect to the ring 19 with the result that when the ring 19 rotates in a horizontal plane the spits 21, due to the vertical engagement of the rollers 23 upon the circular track 18, will rotate about their own horizontal, longitudinal axes, which in turn are rotating about a vertical axis.

Teeth 26 are supplied upon the ring 19; and a pinion gear 27 mounted upon a vertical shaft 28 is immeshed with the teeth 26. The shaft 28 is revolubly mounted in the journals 29, 31 at the upper and lower ends thereof respectively; and a motor 32 is adapted to rotate the shaft 28 through a reduction gear 33, pinion gear 34, and gear 36 rigid with the shaft 28.

A burner 38 is arranged concentrically of the ring 19 a suitable distance below the spits 21, this burner being supplied with fuel through the pipe 39 and valve 41. A baffle plate 42 is positioned above the burner 38 for the purpose of spreading the heat emanating therefrom. The baffle plate 42 may also be used to toast buns or to heat receptacles of food, etc. A rod 43 provides a convenient support for the burner 38 and plate 42, this rod being held in position by means of a flange 44 rigid upon the floor 8 of the booth. If it be desired, a supplementary burner 46 may be positioned within the booth, this burner being supplied with fuel through the pipe 47 and valve 48 in communication with the fuel pipe 39.

I claim:

1. In a broiler a source of heat, a non-combustible plate above said source of heat, a ring surrounding said plate, a plurality of spits revolubly mounted in said ring and extending radially therethrough toward its center, the inner ends of said spits being pointed, rollers rigid with the outer ends of said spits, a stationary circular track surrounding said ring and supporting said rollers, teeth upon said ring, a gear immeshed with said teeth, and means for rotating said gear.

2. In a broiler a source of heat, a non-combustible flat-topped plate above said source of heat, a ring surrounding said plate, a plurality of spits revolubly mounted in said ring and extending radially therethrough toward its center, the inner ends of said spits being pointed, rollers rigid with the outer ends of said spits, a stationary circular track surrounding said ring and supporting said rollers, and means for rotating said ring.

3. In a broiler a source of heat, a non-combustible flat-topped plate above said source of heat, a ring surrounding said plate, a plurality of spits revolubly mounted in said ring and extending radially therethrough toward its center, rollers rigid with the outer ends of said spits, a stationary circular track surrounding said ring and supporting said rollers, and means for rotating said ring.

4. In a broiler, a horizontal plate having a circuits aperture therein and a shoulder about said aperture defining a circular track, a ring disposed within said aperture, a plurality of spits extending through and journalled within said ring, the inner ends of said spits being adapted to retain articles of food to be broiled, a roller rigid with the outer end of each spit and resting upon said track inside the shoulder, a burner disposed below the inner ends of said spits, and a flat-topped baffle plate disposed between the spits and burner.

5. In a broiler, a horizontal plate having a circular aperture therein and a shoulder about said aperture defining a circular track, a ring disposed within said aperture, a plurality of spits extending through and journalled within said ring, the inner ends of said spits being adapted to retain articles of food to be broiled, a roller rigid with the outer end of each spit and resting upon said track inside the shoulder, and a burner disposed below the inner ends of said spits.

In testimony whereof I have signed my name to this specification.

CHARLES F. FERNALD.